(12) United States Patent
Wang et al.

(10) Patent No.: US 8,385,540 B2
(45) Date of Patent: **\*Feb. 26, 2013**

(54) BLOCK CIPHER ALGORITHM BASED ENCRYPTION PROCESSING METHOD

(75) Inventors: Wei Wang, Shaanxi (CN); Jun Cao, Shaanxi (CN); Xiang Yan, Shaanxi (CN)

(73) Assignee: China IWNCOMM Co., Ltd., Xi'an (CN)

( * ) Notice: Subject to any disclaimer, the term of this patent is extended or adjusted under 35 U.S.C. 154(b) by 380 days.

This patent is subject to a terminal disclaimer.

(21) Appl. No.: 12/743,492

(22) PCT Filed: Nov. 13, 2008

(86) PCT No.: PCT/CN2008/073040
§ 371 (c)(1),
(2), (4) Date: May 18, 2010

(87) PCT Pub. No.: WO2009/067928
PCT Pub. Date: Jun. 4, 2009

(65) Prior Publication Data
US 2010/0254530 A1    Oct. 7, 2010

(30) Foreign Application Priority Data
Nov. 19, 2007   (CN) .......................... 2007 1 0019109

(51) Int. Cl.
*H04K 1/00* (2006.01)
*H04K 1/04* (2006.01)
*H04L 9/00* (2006.01)
(52) U.S. Cl. ................ 380/28; 380/37; 380/42; 380/44; 380/268
(58) Field of Classification Search .................... 380/28, 380/37, 42, 44, 268
See application file for complete search history.

(56) References Cited

U.S. PATENT DOCUMENTS
(Continued)

FOREIGN PATENT DOCUMENTS
| CN | 1734527 A | 2/2006 |
| CN | 1845213 A | 10/2006 |

(Continued)

OTHER PUBLICATIONS

Russian Decision on Grant regarding Application No. 201024832/08(035345), issued Sep. 5, 2011. Translation provided by Unitalen Attorneys at Law.

(Continued)

*Primary Examiner* — Mohammad W Reza
(74) *Attorney, Agent, or Firm* — Harness, Dickey & Pierce, P.L.C.

(57) ABSTRACT

A block cipher algorithm based encryption processing method comprises the following steps: external key registration, external data registration, key expansion, data encryption conversion, internal data registration, and data iteration processing, which solves the problems of the prior ciphering method based on block cipher algorithm, such as low ciphering efficiency and high implementation cost, and efficiently reduces the resource consumption under the premise of keeping the high efficiency of the prior art, thereby reducing the implementation cost of the device. When the number of the conversion component is 1, the resource consumption is only about 60 percent of the prior art; and when the number of the conversion component is 2, the resource consumption is only about 70 percent of the prior art. The present invention increases a sub-key registration unit, which can reduce the critical paths and increase the clock dominant frequency of the ciphering equipment during the implementation of integrated circuits, thereby improving the ciphering capacity of the inventive method.

4 Claims, 3 Drawing Sheets

U.S. PATENT DOCUMENTS

| | | | |
|---|---|---|---|
| 5,381,480 A | | 1/1995 | Butter et al. |
| 8,155,308 B1* | | 4/2012 | Poo et al. ............... 380/29 |
| 2002/0159599 A1 | | 10/2002 | Matsui et al. |
| 2004/0047466 A1* | | 3/2004 | Feldman et al. ............... 380/37 |
| 2004/0252831 A1 | | 12/2004 | Uehara |
| 2006/0002549 A1* | | 1/2006 | Avasarala et al. ............... 380/44 |
| 2006/0045265 A1 | | 3/2006 | Matsui et al. |
| 2010/0322411 A1* | | 12/2010 | Lubberhuizen ............... 380/28 |

FOREIGN PATENT DOCUMENTS

| | | |
|---|---|---|
| CN | 1983925 A | 6/2007 |
| CN | 101044535 A | 9/2007 |
| CN | 101159544 A | 4/2008 |
| CN | 101159545 A | 4/2008 |
| JP | 10075240 A | 3/1998 |
| JP | 2000056679 A | 2/2000 |
| RU | 2206961 C2 | 3/2003 |
| RU | 2206182 C2 | 6/2003 |
| WO | WO-2007075154 A2 | 7/2007 |
| WO | WO-2007113796 A2 | 10/2007 |

OTHER PUBLICATIONS

Takeshi Sugawara et al. "High-performance ASIC Implementations of the 128-bit Block Cipher CLEFIA." Japan. Oct. 31, 2007.

Yier Jin et al. "Implementation of SMS4 Block Cipher on FPGA." 2006.

Shuenn-Shyang Wang and Wan-Sheng Ni. "An Efficient FPGA Implementation of Advanced Encryption Standard Algorithm." Department of Electrical Engineering, Tatung University. Proceedings of 2004 IEEE International Symposium on Circuits and Systems. May 23-26, 2004.

Chih-Chung Lu and Shau-Yin Tseng. "Integrated Design of AES (Advanced Encryption Standard) Encrypter and Decrypter." Proceedings The IEEE International Conference on Application-Specific Systems, Architectures, and Processors. Jul. 17-19, 2002.

Japanese Notice of Reasons for Rejection regarding Application No. 2010-534349, mailed Sep. 25, 2012. Translation provided by Unitalen Attorneys at Law.

"SMS4 Encryption Algorithm for Wireless Networks." Version 1.03. May 15, 2008.

European Search Report regarding Application No. 08854930.8-2415 / 2216933, dated Sep. 19, 2012.

Takeshi Sugawara et al. "ASIC Implementations of the 128-bit Block Cipher CLEFIA." Computer Security Symposium 2007. vol. 2007, No. 10. Oct. 31, 2007. Information Processing Society of Japan.

* cited by examiner

BLOCK CIPHER ALGORITHM BASED ENCRYPTION PROCESSING METHOD

CROSS-REFERENCE TO RELATED APPLICATIONS

This application is a 371 U.S. National Stage of International Application No. PCT/CN2008/073040, filed Nov. 13, 2008.

FIELD OF THE INVENTION

The present invention relates to the field of information security technologies, and in particular, to a method for an encryption processing based on a block cipher algorithm.

BACKGROUND OF THE INVENTION

The block cipher algorithm mainly includes Data Encryption Standard (DES) algorithm, Triple DES (3DES) algorithm, Advanced Encryption Standard (AES) algorithm, International Data Encryption Algorithmic (IDEA) and SMS4 algorithm published by the State Cryptography Administration of China. The key components for implementing block cipher algorithm are key expansion unit, encryption unit and sub-key array storage unit. Wherein, the key expansion unit and the encryption unit have similar internal structure, which mainly includes a data registration component and a data conversion component.

The data registration component mainly employs a universal trigger for registering data. During a clock period, the data registered by the component will not be changed. The universal trigger is a data registration device which inputs the data on the data input port to the output port of the trigger at the rising edge or falling edge of a clock period; but at other moments, the data on the output port of the trigger will not be changed.

The data conversion component is a component for data processing according to block cipher algorithm, for example, a component for data processing according to SMS4 cipher algorithm. The operation carried out by the data conversion component has only one synthetic replacement as specified by the cipher algorithm.

The sub-key array storage unit is adapted to store a sub-key array. In the existing technology, the sub-key array is generally a data array that is preconfigured before the encryption and decryption processing and generated by a key expansion unit. In SMS4 cipher algorithm, the data of a sub-key array storage unit are arranged in the order of addresses and may be named as rk0, rk1 . . . rk31.

Figure 1:
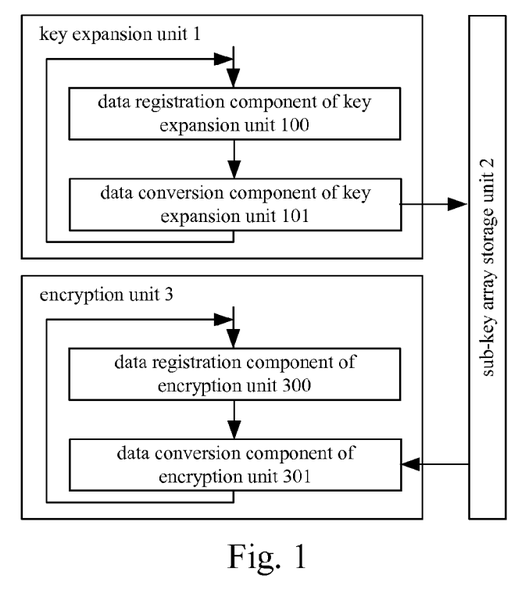
FIG. 1 is a schematic diagram showing the first structure of a device used in the existing method for encryption and decryption processing.

At present, the process for the data encryption and decryption process according to the SMS4 cipher algorithm includes two independent stages: key expansion stage and data encryption stage. As shown in FIG. 1, first of all, a key expansion unit expands a key to a sub-key array and stores it in a sub-key array storage unit according to the precedence order, and then an encryption unit accomplishes the data encryption by using the sub-key array generated by the key expansion unit.

A) Key Expansion Stage

1) Inputting an External Key to Data Registration Component of the Key Expansion Unit After a preliminary processing, the external key is input to the data registration component 100 of the key expansion unit for registration.

2) Data Conversion

The data registered in the data registration component 100 of the key expansion unit are input to the data conversion component 101 of the key expansion unit for conversion, and sub-keys are obtained.

3) Data Iteration

The data after the previous conversion processing are stored in the data conversion component 100 of the key expansion unit, and at the same time, the sub-keys obtained are stored in the first line of the sub-key array storage unit 2, then the data registered in the data registration component 100 of the key expansion unit are again input to the data conversion component 101 of the key expansion unit for data conversion, and the sub-keys obtained after processing are stored in the next line of sub-key array storage unit 2, and the data conversion processing is repeated 32 time, thus a sub-key array of 32×32 bit=1024 bit is obtained.

B) Data Encryption Stage

1) Inputting External Data to the Data Registration Component of the Encryption Unit External data are input to the data registration component 300 of an encryption unit for registration.

2) Data Conversion

The data registered in the data registration component 300 of the encryption unit are input to the data conversion component 301 of the encryption unit, and at the same time, the data corresponding to the first line of the sub-key array stored in sub-key array storage unit 2 are input to the data conversion component 301 of the encryption unit for conversion.

3) Data Iteration

The data after the previous data conversion processing are registered in the data registration component 300 of the encryption unit, then the data registered in the data registration component 300 of the encryption unit are again input to the data registration component 301 of the encryption unit, and at the same time, the sub-keys at the next line of the sub-key array storage unit 2 are also input to the data conversion component 301 of the encryption unit for data conversion again, and the processing is repeated 32 times and the final data processing result is obtained.

Figure 2:
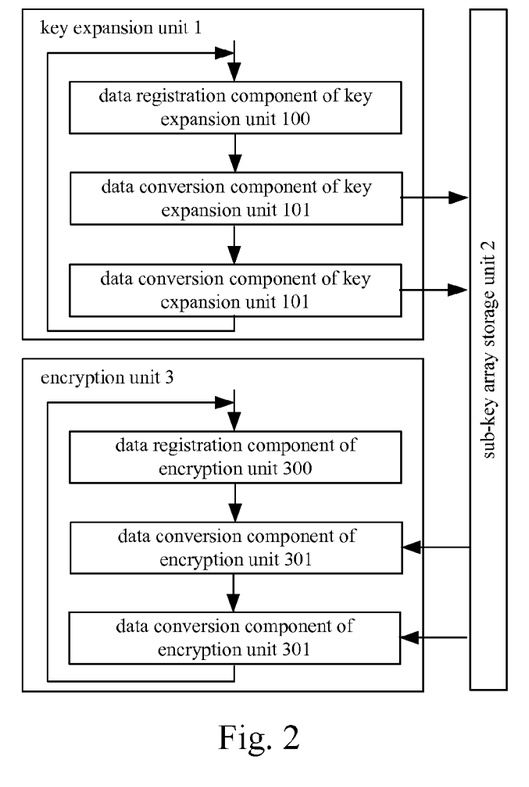
FIG. 2 is a schematic diagram showing the second structure of the device used in the existing method for encryption and decryption processing.

In the above encryption algorithm, 32 clock periods are needed to process a set of data and the efficiency is low. To solve this problem, the processing efficiency can be improved by increasing the number of data conversion components, for example, in the solution shown in FIG. 2, a set of data of 128 bit may be processed in 16 clock periods.

In the existing technology, the sub-key array storage component is a necessary component. If a register is employed in an integrated circuit to implement the sub-key array storage component of 1024 bit, a logical resource of about 10,000 gates are consumed (in the solution of FIG. 1, the total resource consumption is about 25,000 gates), which occupies about 40% of the total resources, thus the implementation cost is very high.

SUMMARY OF THE INVENTION

It is an object of the present invention to provide a low-cost and high-efficiency method for an encryption processing based on a block cipher algorithm, so as to solve the technical problem of the prior method, that is, a high implementation cost for the encryption processing based on the block cipher algorithm.

The technical solution of the invention is as follows.

A method for an encryption processing based on a block cipher algorithm, including:

1] External Key Registering: when a clock edge of a clock period comes, a data registration component of a key expansion unit registers an external key which is input;

2] External Data Registering: when a clock edge of the clock period comes, a data registration component of an encryption unit registers the external data which is input 3] Key Expanding: during the clock period, a data conversion component of the key expansion unit receives data registered by a data registration component of the key expansion unit, carries out a key expanding, and inputs sub-keys obtained to a data conversion component of the encryption unit;

4] Data Encrypting and Converting: during the clock period, the data conversion component of the encryption unit receives data registered by the data registration component of the encryption unit, and carries out the data encrypting and converting on the data from a receiving end by using the sub-keys obtained in the key expanding step;

5] Internal Data Registering: when a clock edge of a next clock period comes, the data registration component of the key expansion unit registers the data obtained by the data conversion component of the key expansion unit;

the data registration component of the encryption unit registers the data obtained by the data conversion component of the encryption unit;

6] Data Iterating: the key expanding step, the data encrypting and converting step and the internal data registering step are repeated, till the number of times that the data are converted reaches that specified in the block cipher algorithm, and thus an encryption on a set of data is completed.

The above technical solution has the following advantages.

1) Because the sub-key array storage unit is omitted, the method for the encryption processing according to the invention can efficiently lower resource consumption while maintaining the high efficiency; thereby the device implementation cost is lowered.

2) By the method for encryption processing according to the invention, when the number of the conversion component is 1, the resource consumption is only 60% of that of the prior method, and when the number of the conversion components is 2, the resource consumption is only 70% of that of the prior method.

3) A sub-key registration unit is added, which can reduce the critical paths and increase the clock frequency of the ciphering equipment during the implementation of integrated circuits. Thus, the ciphering capacity of the method of the invention is improved.

Particularly, 1—key expansion unit; 100—data registration component of the key expansion unit; 101 (or 101a, 101b)—data conversion component of the key expansion unit; 2—sub-key array storage unit; 3—encryption unit; 300—data registration component of the encryption unit; 301 (or 301a, 301b)—data conversion component of the encryption unit; 4—sub-key registration unit; 401 (or 401a, 401b)—sub-key registration component.

DETAILED DESCRIPTION OF THE EMBODIMENTS

The method of the invention is mainly implemented via an encryption processing device based on block cipher algorithm. The invention will now be specifically illustrated below in conjunction with the drawings.

Embodiment 1

Figure 3:
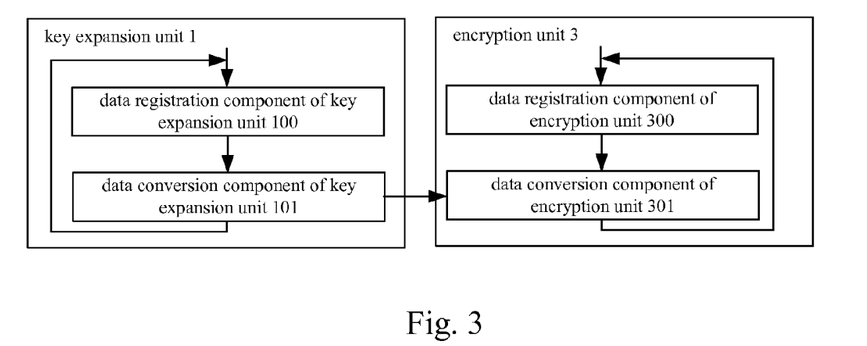
FIG. 3 is a schematic diagram showing the first structure of the device used in the method for encryption processing according to the invention.

The first encryption processing device based on block cipher algorithm, as shown in FIG. 3, includes a key expansion unit 1 and an encryption unit 3.

The key expansion unit 1 includes a data registration component 100 of the key expansion unit and a data conversion component 101 of the key expansion unit. The output port of the data registration component 100 of the key expansion unit is connected with the input port of the data conversion component 101 of the key expansion unit, and the output port of the data conversion component 101 of the key expansion unit is connected with the input port of the data registration component 100 of the key expansion unit.

The encryption unit 3 includes a data registration component 300 of the encryption unit and a data conversion component 301 of the encryption unit. The output port of the data registration component 300 of the encryption unit is connected with the input port of the data conversion component 301 of the encryption unit, and the output port of the data conversion component 301 of the encryption unit is connected with the input port of the data registration component 300 of the encryption unit.

Particularly, the sub-key output port of the data conversion component 101 of the key expansion unit is connected with the sub-key input port of the data conversion component 301 of the encryption unit.

Referring to FIG. 3, the steps for implementing the embodiment of the method of the invention via the first encryption processing device based on block cipher algorithm are as follows.

1] External Key Registering: When a clock edge of a clock period comes, an external key that is processed is input to the data registration component 100 of the key expansion unit for registration.

2] External Data Registering: When a clock edge of the clock period comes, a set of external data are input to the data registration component 300 of the encryption unit for registration.

3] Key Expanding: During the clock period, the registered data in the data registration component 100 of the key expansion unit are input to the data conversion component 101 of the key expansion unit for key expansion, and the sub-keys obtained are input to the data conversion component 301 of the encryption unit.

4] Data Encrypting and Converting: During the clock period, the registered data in the data registration component 300 of the encryption unit are input to the data conversion component 301 of the encryption unit, and the data conversion component 301 of the encryption unit carries out the data encrypting and converting.

5] Internal Data Registering: When a clock edge of the next clock period comes, the data obtained by the data conversion component 101 of the key expansion unit are input to the data registration component 100 of the key expansion unit for registration; and the data obtained by the data conversion component 301 of the encryption unit are input to the data registration component 300 of the encryption unit for registration;

6] Data Iterating: The key expanding step, the data encrypting and converting step and the internal data registering step are repeated, till the number of times that the data are converted reaches that specified in the block cipher algorithm, and the encryption on the set of data is completed.

Embodiment 2

Figure 4:
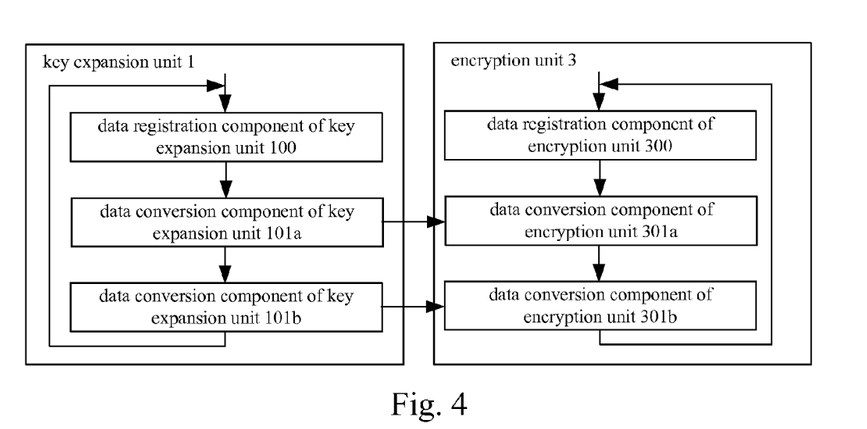
FIG. 4 is a schematic diagram showing the second structure of the device used in the method for encryption processing according to the invention.

The second encryption processing device based on the block cipher algorithm, as shown in FIG. 4, includes a key expansion unit 1 and an encryption unit 3.

The key expansion unit 1 includes a data registration component 100 of the key expansion unit and two data conversion components 101a and 101b of the key expansion unit. The output port of the data registration component 100 of the key expansion unit is connected with the input port of the first data conversion component 101a of the key expansion unit. Two data conversion components 101a and 101b of the key expansion unit are connected in turn. The output port of the second data conversion component 101b of the key expansion unit is connected with the input port of the data registration component 100 of the key expansion unit.

The encryption unit 3 includes a data registration component 300 of the encryption unit and two data conversion components 301a and 301b of the encryption unit. The output port of the data registration component 300 of the encryption unit is connected with the input port of the first data conversion component 301a of the encryption unit. Two data conversion components 301a and 301b of the encryption unit are connected in turn. The output port of the second data conversion component 301b of the encryption unit is connected with the input port of the data registration component 300 of the encryption unit.

The sub-key output port of the first data conversion component 101a of the key expansion unit is connected with the sub-key input port of the first data conversion component 301a of the encryption unit. The sub-key output port of the second data conversion component 101b of the key expansion unit is connected with the sub-key input port of the second data conversion component 301b of the encryption unit.

The number of the data conversion components of the key expansion unit is equal to the number of the data conversion components of the encryption unit, and may be 3, 4 to 32 or 48, and preferably 1, 2 or 4.

Referring to FIG. 4, the steps for implementing the embodiment of the method of the invention via the second encryption processing device based on the block cipher algorithm are as follows.

1] External Key Registering: When a clock edge of a clock period comes, an external key that is processed is input to the data registration component 100 of the key expansion unit for registration.

2] External Data Registering: When a clock edge of the clock period comes, a set of external data are input to the data registration component 300 of the encryption unit for registration.

3] Key Expanding: During the clock period, the registered data in the data registration component 100 of the key expansion unit are input to the data conversion component 101a of the key expansion unit for key expansion and sub-keys obtained are input to the data conversion component 301a of the encryption unit while the output data of the data conversion component 101a of the key expansion unit are input to next data conversion component 101b of the key expansion unit. A plurality of data conversion components of the key expansion unit carry out the key expanding in turn.

4] Data Encrypting and Converting: During the clock period, the registered data in the data registration component 300 of the encryption unit are input to the data conversion component 301a of the encryption unit. The data conversion component 301a of the encryption unit carries out data encrypting and converting, and the output data of the data conversion component 301a of the encryption unit are input to the next data conversion component 301b of the encryption unit. A plurality of data conversion components of the encryption unit carry out data encrypting in turn.

5] Internal Data Registering: When a clock edge of the next clock period comes, the output data of the last data conversion component (101b in this embodiment) of the key expansion unit are input to the data registration component 100 of the key expansion unit for registration. The output data of the last data conversion component (301b in this embodiment) of the encryption unit are input to the data registration component 300 of the encryption unit for registration.

6] Data Iterating: The key expanding step, the data encrypting and converting step and the internal data registering step are repeated, till the number of times that the data are converted reaches that specified in the block cipher algorithm, and the encryption on the set of data is completed.

Embodiment 3

Figure 5:
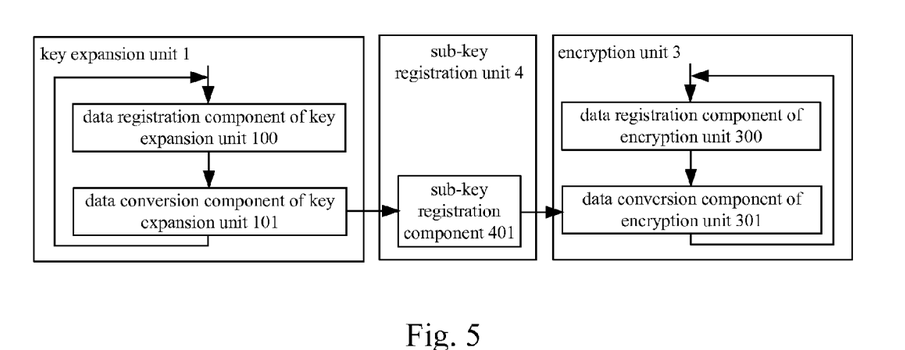
FIG. 5 is a schematic diagram showing the third structure of the device used in the method for encryption processing according to the invention.

The third encryption processing device based on the block cipher algorithm, as shown in FIG. 5, includes a key expansion unit 1, a sub-key registration unit 4 and an encryption unit 3.

The key expansion unit 1 includes the data registration component 100 of the key expansion unit and the data conversion component 101 of the key expansion unit. The output port of the data registration component 100 of the key expansion unit is connected with the input port of the data conversion component 101 of the key expansion unit, and the output port of the data conversion component 101 of the key expansion unit is connected with the input port of the data registration component 100 of the key expansion unit.

The sub-key registration unit 4 includes a sub-key registration component 401. The sub-key registration component 401 may be a universal trigger or a register.

The encryption unit 3 includes the data registration component 300 of the encryption unit and one data conversion component 301 of the encryption unit. The output port of the data registration component 300 of the encryption unit is connected with the input port of the data conversion component 301 of the encryption unit, and the output port of the data conversion component 301 of the encryption unit is connected with the input port of the data registration component 300 of the encryption unit.

The sub-key output port of the data conversion component 101 of the key expansion unit is connected with the input port of sub-key registration component 401, and the output port of the sub-key registration component 401 is connected with the sub-key input port of the data conversion component 301 of the encryption unit.

Referring to FIG. 5, the steps for implementing the embodiment of the method of the invention via the third encryption processing device based on the block cipher algorithm are as follows.

1] External Key Registering: When a clock edge of a clock period comes, an external key that is processed is input to the data registration component 100 of the key expansion unit for registration.

2] Key Pre-Expanding: During the clock period in which the external key registering step is carried out, the registered data in the data registration component 100 of the key expansion unit are input to the data conversion component 101 of the key expansion unit for key expansion. The sub-keys obtained are input to the input port of the connected sub-key registration component 401. The data converted and obtained by the data conversion component 101 of the key expansion unit are input to the input port of the data registration component 100 of the key expansion unit.

3] Key Buffer Registering: When the clock edge of the next clock period after the external key registering step comes, the data converted and obtained by the data conversion component 101 of the key expansion unit are input to the data registration component 100 of the key expansion unit for registration. The sub-keys of the data conversion component 101 of the key expansion unit are input to the sub-key registration component 401 for registration.

4] External Data Registering: When the clock edge of the next clock period after the external key registering step comes, a set of external data are input to the data registration component 300 of the encryption unit for registration.

5] Key Expanding: During the clock period, the registered data in the data registration component 100 of the key expansion unit are input to the data conversion component 101 of the key expansion unit for key expansion. The sub-keys obtained are input to the input port of the connected sub-key registration component 401. At the same time, the output data of the data conversion component 101 of the key expansion unit are input to the input port of the data registration component 100 of the key expansion unit and the sub-keys output by the sub-key registration component 401 are input to the data conversion component 301 of the encryption unit.

6] Data Encrypting and Converting: During the clock period, the registered data in the data registration component 300 of the encryption unit are input to the data conversion component 301 of the encryption unit. The data conversion component 301 of the encryption unit carries out data encrypting and converting. The output data of the data conversion component 301 of the encryption unit are input to the input port of the data registration component 300 of the encryption unit.

7] Internal Data Registering: When the clock edge of the next clock period comes, the data converted and obtained by the data conversion component 101 of the key expansion unit are input to the data registration component 100 of the key expansion unit for registration. The sub-keys of the data conversion component 101 of the key expansion unit are input to the sub-key registration component 401 for registration. The data converted and obtained by the data conversion component 301 of the encryption unit are input to the data registration component 300 of the encryption unit for registration.

8] Data Iterating: The key expanding step, the data encrypting and converting step and the internal data registering step are repeated, till the number of times that the data are converted reaches that specified in the block cipher algorithm, and then the encryption on the set of data is completed.

Embodiment 4

Figure 6:
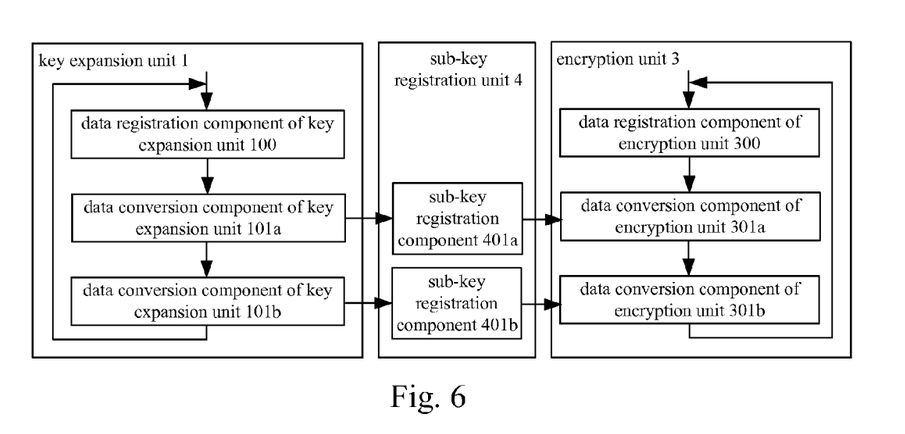
FIG. 6 is a schematic diagram showing the fourth structure of the device used in the method for encryption processing according to the invention.

The fourth encryption processing device based on the block cipher algorithm, as shown in FIG. 6, includes a key expansion unit 1, a sub-key registration unit 4 and an encryption unit 3.

The key expansion unit 1 includes the data registration component 100 of the key expansion unit and two data conversion components 101a and 101b of the key expansion unit. The output port of the data registration component 100 of the key expansion unit is connected with the input port of the first the data conversion component 101a of the key expansion unit and two key expansion unit-data conversion components 101a and 101b are connected in turn. The output port of the second data conversion component 101b of the key expansion unit is connected with the input port of the data registration component 100 of the key expansion unit.

The sub-key registration unit 4 includes two sub-key registration components 401a and 401b. The sub-key registration component may be a universal trigger or a register.

The encryption unit 3 includes the data registration component 300 of the encryption unit and two data conversion components 301a and 301b of the encryption unit. The output port of the data registration component 300 of the encryption unit is connected with the input port of the first the data conversion component 301a of the encryption unit and two data conversion components 301a and 301b of the encryption unit are connected in turn. The output port of the second the data conversion component 301b of the encryption unit is connected with the input port of the data registration component 300 of the encryption unit.

The sub-key output port of the first the data conversion component 101a of the key expansion unit is connected with the input port of the first sub-key registration component 401a and the output port of the first sub-key registration component 401a is connected with the sub-key input port of the first the data conversion component 301a of the encryption unit. The sub-key output port of the second the data conversion component 101b of the key expansion unit is connected with the input port of the second sub-key registration component 401b, and the output port of the second sub-key registration component 401b is connected with the sub-key input port of the second the data conversion component 301b of the encryption unit.

Particularly, the number of the data conversion components of the key expansion unit, the number of sub-key registration components and the number of data conversion components of the encryption unit are equal to each other, and may be 3, 4 to 32 or 48, and preferably 1 or 2 or 4.

Referring to FIG. 6, the steps for implementing the embodiment of the method of the invention via the fourth encryption processing device based on the block cipher algorithm are as follows.

1] External Key Registering: When a clock edge of a clock period comes, an external key that is processed is input to the data registration component 100 of the key expansion unit for registration.

2] Key Pre-Expanding: During the clock period in which the external key registering step is carried out, the registered data in the data registration component 100 of the key expansion unit are input to the first data conversion component 101a of the key expansion unit for key expansion. The sub-keys obtained are input to the input port of the connected first sub-key registration component 401a, and at the same time, the output data of the first data conversion component 101a of the key expansion unit are input to the next data conversion component 101b of the key expansion unit for key expansion for the second time. A plurality of data conversion components of the key expansion unit carry out the converting in turn and input the sub-keys generated to an input port of a connected sub-key registration component. The output data of the last data conversion component (101b in this embodiment) of the key expansion unit are input to the input port of the data registration component 100 of the key expansion unit.

3] Key Buffer Registering: When the clock edge of the next clock period after the external key registering step comes, the data converted and obtained by the last data conversion component (101b in this embodiment) of the key expansion unit are input to the data registration component 100 of the key expansion unit for registration. The sub-keys in the data conversion component of the key expansion unit are input to corresponding sub-key registration component for registration.

4] External Data Registering: When the clock edge of the next clock period after the external key registering step comes, a set of external data are input to the data registration component 300 of the encryption unit for registration.

5] Key Expanding: During the clock period, the registered data in the data registration component 100 of the key expansion unit are input to the first data conversion component 101a of the key expansion unit for key expansion. The sub-keys obtained are input the input port of the connected first sub-key registration component 401a. At the same time, the output data of the first data conversion component 101a of the key expansion unit are input to the next data conversion component 101b of the key expansion unit for key expansion for the second time. A plurality of data conversion components of the key expansion unit carry out the key expanding in turn and input the sub-keys generated to an input port of a connected sub-key registration component. The output data of the last data conversion component (101b in this embodiment) of the key expansion unit are input to the data input port of the data registration component 100 of the key expansion unit.

6] Data Encrypting And Converting: During the clock period, the registered data in the data registration component 300 of the encryption unit are input to the first data conversion component 301a of the encryption unit, the sub-keys in the first sub-key registration component 401a are input to the first data conversion component 301a of the encryption unit. The first data conversion component 301a of the encryption unit carries out data encrypting and converting. The encrypted and converted data in the first data conversion component 301a of the encryption unit are input to the second data conversion component 301b of the encryption unit, and the sub-keys in the second sub-key registration component 401b are input to the second data conversion component 301b of the encryption unit. The second data conversion component 301b of the encryption unit carries out the data encrypting and converting. A plurality of data conversion components of the encryption unit corresponding to the data conversion components of the key expansion unit carry out data encrypting and converting in turn, and the encrypted and converted data in the last data conversion component (301b in this embodiment) of the encryption unit are input to the data input port of the data registration component 300 of the encryption unit.

7] Internal Data Registering: When the clock edge of the next clock period comes, the data converted and obtained by the last data conversion component (101b in this embodiment) of the key expansion unit are input to the data registration component 100 of the key expansion unit for registration. The sub-keys in the data conversion component of the key expansion unit are input to corresponding sub-key registration component for registration. The data converted and obtained by the last data conversion component (301b in this embodiment) of the encryption unit are input to the data registration component 300 of the encryption unit for registration.

8] Data Iterating: The key expanding step, the data encrypting and converting step and the internal data registering step are repeated, till the number of times that the data are converted reaches that specified in the block cipher algorithm, and then the encryption on the set of data is completed.

If the encryption device has a plurality of data conversion components of the key expansion unit, a plurality of sub-key registration component and a plurality of data conversion components of the encryption unit, they carry out the key expanding and data encrypting in turn according to the connection relations.

In the case that SMS4 algorithm is specifically employed as the block cipher algorithm, the number of conversion times during data iterating in the method for encryption processing in the above four embodiments are 32.

The invention claimed is:

1. A method for an encryption processing based on a block cipher algorithm, comprising:
   1] registering an external key, which comprises when a clock edge of a clock period comes, a data registration component of a key expansion unit registers an external key which is input;
   2] registering an external data, which comprises when the clock edge of the clock period comes, a data registration component of an encryption unit registers an external data which is input;
   3] expanding a key, which comprises during the clock period, a data conversion component of the key expansion unit receives data registered by the data registration component of the key expansion unit, carries out a step of expanding a key, and inputs sub-keys obtained to a data conversion component of the encryption unit;
   4] encrypting and converting data, which comprises during the clock period, the data conversion component of the encryption unit receives data registered by the data registration component of the encryption unit, and carries out the step of encrypting and converting data on the data from a receiving end by using the sub-keys obtained in the step of expanding a key;
   5] registering internal data, which comprises when a clock edge of a next clock period comes,
   the data registration component of the key expansion unit registers the data obtained by the data conversion component of the key expansion unit;
   the data registration component of the encryption unit registers the data obtained by the data conversion component of the encryption unit;
   6] iterating data, which comprises the step of expanding a key, the step of encrypting and converting data and the step of registering internal data are repeated, till a number of times that the data are converted reaches that specified in the block cipher algorithm, and thus an encryption on a set of data is completed;
   wherein, the method further comprising a step of pre-expanding a key and a step of registering a key buffer between the step of registering an external key and the step of registering an external data;
   the step of pre-expanding a key comprises during the clock period in which the step of registering an external key is carried out, inputting the registered data in the data registration component of the key expansion unit to the data conversion component of the key expansion unit for key expansion, and inputting the sub-keys obtained to an input port of a connected sub-key registration component; inputting the data converted and obtained by the data conversion component of the key expansion unit to an input port of the data registration component of the key expansion unit;

the step of registering a key buffer comprises when the clock edge of the next clock period after the step of registering an external key comes, inputting the data converted and obtained by the data conversion component of the key expansion unit to the data registration component of the key expansion unit for registration; and inputting the sub-keys of the data conversion component of the key expansion unit to the sub-key registration component for registration;

thus, the step of expanding a key comprises receiving, by a data conversion component of the key expansion unit, the data registered by the data registration component of the key expansion unit, carrying out the step of expanding a key, and inputting the sub-keys obtained to the input port of the sub-key registration component;

the step of registering internal data further comprises registering, by the sub-key registration component, the sub-keys obtained by the data conversion component of the key expansion unit; and the step of encrypting and converting data comprises during the clock period in which the step of registering internal data is carried out, receiving, by the data conversion component of the encryption unit, the sub-keys registered by the sub-key registration component, and carrying out the step of encrypting and converting data on the data from the receiving end by using the sub-key;

wherein: the step of pre-expanding a key comprises during the clock period in which the step of register an external key is carried out, inputting the registered data in the data registration component of the key expansion unit to a first data conversion component of the key expansion unit for key expansion, inputting the sub-keys obtained to the input port of the connected sub-key registration component, and at the same time, inputting the output data of the first data conversion component of the key expansion unit to a next data conversion component of the key expansion unit for key expansion for the second time; carrying out, by a plurality of data conversion components of the key expansion units, the conversion in turn and inputting the sub-keys generated to an input port of the connected sub-key registration component, inputting output data of a last data conversion component of the key expansion unit to an input port of the data registration component of the key expansion unit;

the step of registering a key buffer comprises when the clock edge of the next clock period after the step of registering an external key comes, inputting the data converted and obtained by the last data conversion component of the key expansion unit to the data registration component of the key expansion unit for registration; inputting the sub-keys in the data conversion component of the key expansion unit to corresponding sub-key registration component for registration;

the step of expanding a key comprises inputting the registered data in the data registration component of the key expansion unit to the first data conversion component of the key expansion unit for key expansion, inputting the sub-keys obtained to the input port of the connected sub-key registration component, and at the same time, inputting the output data of the first data conversion component of the key expansion unit to the next data conversion component of the key expansion unit for key expansion for the second time; carrying out, by the plurality of data conversion component of the key expansion units, the key expansion in turn and inputting sub-keys generated to an input port of the connected sub-key registration component, and inputting the output data of the last data conversion component of the key expansion unit to the data input port of the data registration component of the key expansion unit;

the step of encrypting and converting data comprises during the clock period in which the step of register internal data is carried out, inputting the registered data in the data registration component of the encryption unit to the first data conversion component of the encryption unit, inputting the sub-keys in a first sub-key registration component to the first data conversion component of the encryption unit, carrying out, by the first data conversion component of the encryption unit, the step of encrypting and converting data, and inputting the encrypted and converted data in the first data conversion component of the encryption unit to a second data conversion component of the encryption unit, inputting the sub-keys in a second sub-key registration component to the second data conversion component of the encryption unit, and carrying out, by the second data conversion component of the encryption unit, the step of encrypting and converting data; carrying out, by a plurality of data conversion components of the encryption unit corresponding to the data conversion component of the key expansion units, the step of encrypting and converting data in turn, and inputting the encrypted and converted data in the last data conversion component of the encryption unit to the data input port of the data registration component of the encryption unit;

the step of registering internal data comprises when the clock edge of the next clock period after the step of expanding a key comes, inputting the data converted and obtained by the last data conversion component of the key expansion unit to the data registration component of the key expansion unit for registration; inputting the sub-keys in the data conversion component of the key expansion unit to the corresponding sub-key registration component for registration; and inputting the data converted and obtained by the last data conversion component of the encryption unit to the data registration component of the encryption unit for registration.

2. The method for the encryption processing based on the block cipher algorithm according to claim 1, wherein:

the step of expanding a key comprises, during the clock period, inputting the registered data in the data registration component of the key expansion unit to the data conversion component of the key expansion unit for key expansion, inputting the sub-keys obtained to the data conversion component of the encryption unit, and at the same time, inputting the output data of the data conversion component of the key expansion unit to next data conversion component of the key expansion unit; and carrying out the key expansion by the plurality of data conversion components of the key expansion unit in turn; and the step of encrypting and converting data comprises: during the clock period, inputting the registered data in the data registration component of the encryption unit to the data conversion component of the encryption unit, carrying out the step of encrypting and converting data by the data conversion component of the encryption unit, and inputting the output data of the data conversion component of the encryption unit to next data conversion component of the encryption unit; and carrying out the data encrypting by the plurality of data conversion components of the encryption unit in turn;

the step of registering internal data comprises: when a clock edge of a next clock period comes, inputting the output data of last data conversion component of the key expansion unit to the data registration component of the key expansion unit for registration; and inputting the output data of last data conversion component of the encryption unit to the data registration component of the encryption unit for registration.

3. The method for the encryption processing based on the block cipher algorithm according to claim 1, wherein, the block cipher algorithm is SMS4 algorithm published by the State Cryptography Administration of China.

4. The method for the encryption processing based on the block cipher algorithm according to claim 2, wherein, the block cipher algorithm is SMS4 algorithm published by the State Cryptography Administration of China.

* * * * *